United States Patent [19]

Cunningham et al.

[11] E Patent Number: Re. 33,060

[45] Reissued Date of Patent: Sep. 19, 1989

[54] HIGH SPEED CARRIER WITH DECKLED UNDERPLY

[75] Inventors: McCleery B. Cunningham; Clement D. LeHardy, both of Hartsville, S.C.

[73] Assignee: Sonoco Products Company, Hartsville, S.C.

[21] Appl. No.: 476,775

[22] Filed: Mar. 18, 1983

Related U.S. Patent Documents

Reissue of:

[64] Patent No.: 3,980,249
Issued: Sep. 14, 1976
Appl. No.: 581,373
Filed: May 27, 1975

[51] Int. Cl.[4] ..... B65H 75/10

[52] U.S. Cl. ..... 242/118.31; 138/150; 493/299

[58] Field of Search ..... 242/118.31, 118.32, 242/118.3; 138/129, 144, 150, 154; 493/276, 297, 299; 156/187

[56] References Cited

U.S. PATENT DOCUMENTS

| | | | |
|---|---|---|---|
| 218,471 | 8/1879 | Ball . | |
| 534,960 | 2/1895 | Kennedy et al. . | |
| 555,564 | 3/1896 | Coram . | |
| 886,884 | 5/1908 | Smith . | |
| 1,287,945 | 12/1918 | Ford . | |
| 1,385,952 | 7/1921 | Routledge . | |
| 1,577,979 | 3/1926 | McCall . | |
| 2,785,700 | 3/1957 | Yovanovich . | |
| 2,914,833 | 12/1959 | Hart et al. | 138/154 |
| 3,002,433 | 10/1961 | Dunlap . | |
| 3,289,973 | 12/1966 | Spencer . | |
| 3,312,250 | 4/1967 | Sirignano et al. . | |
| 3,455,521 | 7/1969 | Cunningham et al. . | |
| 3,524,779 | 8/1970 | Masters . | |
| 3,544,034 | 5/1968 | Jurney et al. . | |

*Primary Examiner*—John M. Jillions
*Attorney, Agent, or Firm*—Bell, Seltzer, Park & Gibson

[57] ABSTRACT

A high speed yarn carrier or tube comprising a plurality of spirally wound plies of paper and incorporating, beneath the very thin overlapped outer surface defining ply, a strong underply provided with opposed deckle edges overlapped to a width no greater than that of the individual deckle edges. The deckle edge overlap is preferably less than a full overlapping whereby a small sink or depression is formed at the overlap.

4 Claims, 1 Drawing Sheet

HIGH SPEED CARRIER WITH DECKLED UNDERPLY

Matter enclosed in heavy brackets [ ] appears in the original patent but forms no part of this reissue specification; matter printed in italics indicates the additions made by reissue.

The present invention relates to new and useful improvements in high speed carriers, for example textile tubes and paper mill cores. More particularly, it is a primary intention of the invention to provide a high speed carrier constructed in a manner so as to avoid the frequent tendency for such tubes to disintegrate or "explode", and at the same time provide a surface which is free [or] *of* any irregularities such as would tend to produce a bumping or bouncing of the tube or carrier during winding operations.

A significant problem encountered in present day high speed winding arises from a tendency for the carriers to peel or disintegrate when there is a fortuitous coincidence of adhesion fault and damage on wind start-up. Basically, after a yarn tube or the like is placed on the winding spindle, it is struck violently by a rotating start-up drum which instantly causes the tube to reach its maximum running speed. This speed can amount to a surface speed of 12,000 feet per minute or higher. The violent action at start-up applies stresses to the surface of the tube. Experimental work has determined that the most vulnerable part of the tube surface is the pointed "dog-ear" on the end of the tube as it is struck by the start-up drum. If this "dog-[ear] *ear*" is not completely stuck or if the paper in this area does not have very good internal bond, there is a tendency for this pointed edge to peel upward causing an initiation of the tube explosion. This in turn causes scrap paper to be thrown about the machine and, in addition to creating losses from the yarn that had been wound on the tube, is of course very disconcerting to the machine operators.

Accordingly, it is a primary object of the invention to avoid this problem of "exploding" tubes. This is effected principally by the provision of a "seamless" ply immediately beneath the surface parchment whereby exposure of the pointed "dog-ear" is avoided. Such a "seamless" ply is formed by utilizing overlying deckle edges on the spirally wound ply immediately under the surface parchment ply. Actual experimental trials have proven that tubes made in this manner are unquestionably more resistant to explosions than the conventional tubes wherein butted edges are relied on.

In connection with the above, provision also must be made to avoid the bumping or bouncing of the tube or carrier during winding operations. As such, the surface of the tube must be smooth, that is without any projections as would occur in a normal edge overlap situation. Thus, when the "seamless" tube proposed herein is manufactured, there theoretically must be a perfect overlap of the deckle edges. This in turn would require precise grinding of the deckle edges and a precise constant width of the ply or strip of paper. For example, using normal manufacturing procedures, a nominal 2 inch ID tube with a 0.150 inch wall would require a ply width of 4⅝ inches and a deckle width of ½ inch. This would produce a theoretical perfect overlap. However, due to manufacturing variances in ply width, deckle width, and weaving on the spiral machine, it is extremely difficult to consistently overlap the ply deckle edges to give a smooth outside surface on the tube. Consequently, some portions of the tube could be expected to have surface ridges or high places due to too much overlap. This in turn will cause bumping or bouncing of the tube against the drive roll in yarn winding operations. By the same token, the uneven surface causes high noise levels and some possible unevenness in the wound material.

Thus, another significant object of the invention is to provide a system whereby a tube strengthening ply overlap can be provided without a corresponding bump or projection in the tube surface. This is done by trimming the overlap ply narrower than usual or as suggested when utilizing plies with butt edges. For example, in the nominal 2 inch ID tube supra, a preferred ply width of 4-17/32 inches would be used. In this manner, when the ply is wound perfectly, the deckle overlap would be 3/32 inch short and a small depression or sink would be evident on the surface of the tube. Due to this overlap shortage, it is extremely unlikely that the ply will have a bump in the surface due to any manufacturing variations in weaving, deckle width or ply width. Accordingly, the tube surface will be smoother and will not produce the bumping or bouncing which is objectionable in the winding operation. A small depression or sink is not felt by the winding drum and therefore will not present problems during the winding operation. While the making of the overlap plies 3/32 inch narrower than usual appears to be satisfactory, it may be possible or desirable to change this width either more or less. Such of course would be determined during production operations.

These together with additional objects and advantages will become more apparent from the following description of the details of construction and operation. Reference is had to the accompanying drawings forming a part hereof, wherein like numerals refer to like parts throughout and in which.

Figure 1:
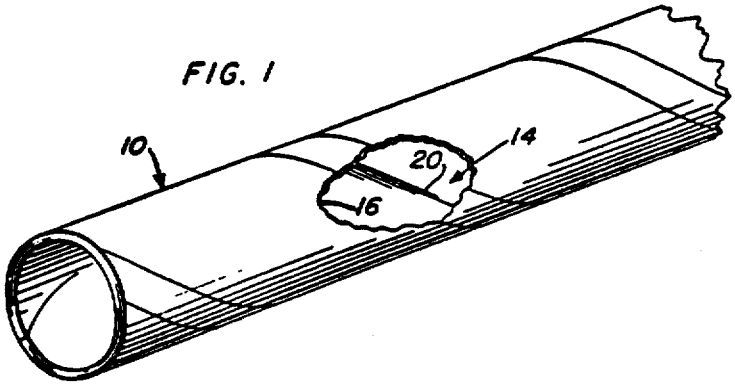
FIG. 1 is a partial perspective view of a high speed carrier or tube constructed in accordance with the present invention with a portion of the surface parchment broken away for purposes of illustration.
Figure 2:
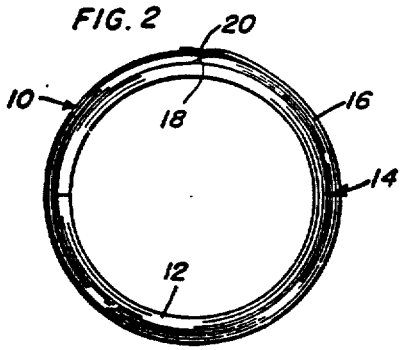
FIG. 2 is an enlarged end view of the carrier.
Figure 3:
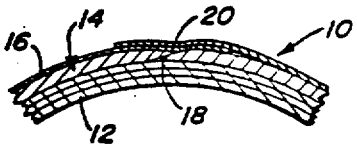
FIG. 3 is a cross-sectional detail through the carrier illustrating the deckle edge overlap.
Figure 6:
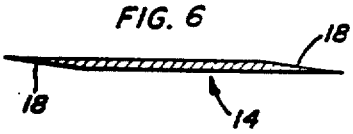
FIG. 6 is a cross-sectional view through the deckle edge ply prior to a spiral winding thereof on the carrier.

Referring now more specifically to the drawings, reference numeral 10 is used to generally designate a high speed carrier or tube constructed in accordance with the present invention. This tube 10, the cross-section of which has been greatly exaggerated in FIG. 3 for purposes of illustration, includes a base 12 conventionally defined by multiple spirally wound plies normally on the order of from 0.015 inch to 0.025 inch in thickness. In one typical example, six such plies will define the base 12 with the spiral edges of each of these plies being spaced slightly and rotationally offset from the edges of the remaining plies.

The final structural ply 14 of the tube 10 is spirally wound about the base 12 and is provided immediately beneath the surface ply 16 so as to define in effect an underply. This ply 14, when utilized in conjunction with the aforedescribed plies of the base 12, will be on the order of 0.015 inch. The ply 14 will differ from the remaining plies by the specific provision of opposed longitudinal deckle edges 18 thereon. The deckle edges 18, when dealing with a ply width of approximately 4⅝ inches will normally be on the order of ½ inch with the deckle edges being so defined whereby a perfect overlap, that is an overlap equal in width to the individual deckle width, will produce a perfectly smooth surface. However, inasmuch as a perfect overlap is, as a practical matter, extremely difficult to consistently achieve due to manufacturing variances, the deckle edges 18 are specifically underlapped, as detailed in the exaggerated cross-section of FIG. 3, so as to define a slight depression or sink 20 along the seam formed. This slight spiral depression 20 produces no bump and no noise such as would occur were the deckle edges 18 excessively overlapped, resulting in a slight ridge. The desired underlapping of the edges 18 will normally be effected utilizing conventional spiral winding equipment by making the ply 14 slightly narrower than what would be considered the normal width for this ply so as to ensure that the deckle edge overlap at no time exceeds a "perfect" overlap.

The tube construction is completed by the outer parchment ply 16 which is extremely thin, on the order of 27 lb. white parchment when utilized in conjunction with structural plies as heretofore described. Such parchment is conventionally utilized so as to provide specific surface characteristics to the tube with the extreme thinness thereof, exaggerated for purposes of illustration in FIG. 3, actually providing no discernible bump or ridge, notwithstanding the overlapping of the edges thereof utilized so as to ensure surface coverage.

Figure 4:
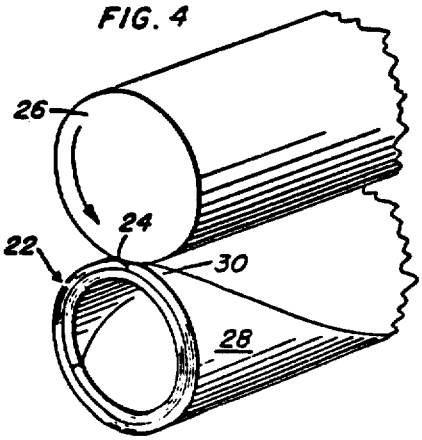
FIG. 4 is a perspective detail of a prior art carrier illustrated in association with a start-up drum.

The particularly significant advantage achieved by the utilization of the deckle edge strengthening ply is the avoidance of any tendency for the tube to disintegrate or "explode" as is a significant problem with conventionally formed tubes. In connection therewith, attention is directed to FIG. 4 wherein a tube 22, constructed in accordance with prior practices and utilizing butted or bump forming overlapped edges 24 in the outer structural ply, has been illustrated in conjunction with an overlying start-up drum 26. The most vulnerable part of the outer structural ply, herein designated by reference numeral 28, is the "dog-ear" 30 on the end of the tube. If this "dog-ear" is not completely stuck or if the paper in this area does not have a very good internal bond, the substantial stresses applied thereto as the tube is engaged by the start-up drum will result in an upward peeling of the edge of the ply 28 and the initiation of the tube disintegration.

Figure 5:
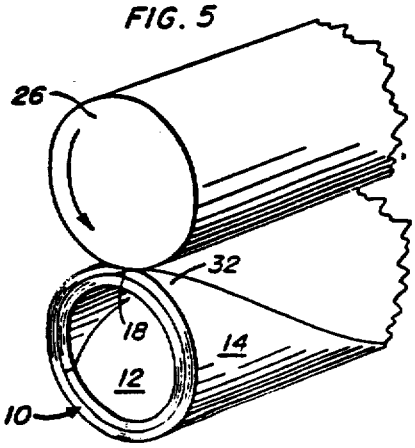
FIG. 5 is a partial perspective view of the improved carrier of the present invention illustrated in conjunction with a start-up drum.

This problem of "exploding" tubes is avoided by utilization of the deckle overlap in the manner proposed herein. In this regard, attention is directed to FIG. 5 which illustrates a conventional start-up drum 26 in operative association with the tube 10 of the present invention. In this instance, it will be noted that the "dog-ear" portion 32 of the outermost deckle edged structural ply 14 is well protected and in fact covered by the overlapping edge. Thus, any tendency for the "dog-ear" 32 to start to peel is completely avoided notwithstanding any possible adhesive deficiency or defect in the paper. It will of course be appreciated that the slight depression or sink 20 also tends to protect the particularly vulnerable "dog-ear" area.

From the foregoing, it is to be appreciated that significant improvements have been achieved in the construction of yarn carriers or tubes and the like. The resultant tube, in addition to avoiding the particular problem of tube disintegration, also achieves what might be called a "no-bump" and a "no-noise" tube. In other words, by the utilization of a deckle edged outer strengthening ply, with the deckle edges specifically underlapped and at no time lapped beyond the width of the deckle edge, no ridge or projection is provided on the surface of the tube such as would produce undesirable bumping or bouncing of the tube during the winding operation and an accompanying disagreeable noise, both of which are frequently experienced in conventionally constructed tubes.

The foregoing is considered illustrative of the principles of the invention. As additional features may occur to those skilled in the art, it is not desired to limit the invention to the exact construction shown and described. Accordingly, all suitable modifications and equivalents may be resorted to, falling within the scope of the invention as claimed.

What is claimed is:

1. A high speed carrier *tube of predetermined inside diameter* for textile winding or the like comprising a multiple ply construction including [, in addition to] a base defined by one or more base forming plies, a thin outer ply incorporating specific surface characteristics, and a carrier strengthening structural underply beneath said outer ply, said underply being defined by a strip spirally, wound on the base, *at a predetermined angle*, said underply strip having opposed deckle edges along the length thereof, said deckle edges, in the spirally wound strip, overlapping one deckle edge over the other deckle edge and being adhesively bonded to each other, *said spirally wound strip specifically cut to a width narrower than the width which would produce a theoretically perfect overlap for the predetermined inside tube diameter and the predetermined winding angle for said strip so that* the width of the overlap of the [one deckle edge] *edges* [over the other deckle edge being] *of said strip is at most* no greater than the width of the [other] deckle [edge] *edges to uniformly form either a slight surface depression or a perfect overlap and to avoid a surface projection on said underply along the entire length of the tube.*

2. The carrier of claim 1 wherein the overlapping of the deckle edges is less than a full overlapping to form a slight surface depression and avoid a surface projection.

[3. A high speed carrier of the type including a base defined by multiple spirally wound plies, said carrier including a strengthening ply spirally wound on and about said base, said strengthening ply having opposed deckle edges along the length thereof said deckle edges overlapping and directly engaging each other to a linear point less than the full width of the deckle edges and defining a slight surface depression along the overlapped edges.]

4. A method of structurally reinforcing a *high speed-*textile carrier *tube of a predetermined inside diameter and of a multiple ply construction having a base defined by one or more base forming plies and a thin outer ply incorporating specific surface characteristics* including *spirally* winding of a *reinforcing* ply *at a predetermined angle* having opposed deckle edges about the [carrier] *base plies and* immediately beneath the [*surface*] *outer* ply, while overlapping the deckle edges to less than a full overlap[,] and defining a small depression along the overlapping edges *along the entire length of the tube by previ-*

*ously trimming the reinforcing ply to a specific width narrower than the width which would produce a theoretically perfect overlap for the predetermined inside tube diameter and the predetermined winding angle for the reinforcing ply.*

5. A method of structurally reinforcing a *high speed* textile carrier *tube of a predetermined inside diameter and of a multiple ply construction having a base defined by one or more base forming plies and a thin outer ply incorporating specific surface characteristics* [defined by multiple spirally wound plies], said method including *spirally*winding [of a ply] *of a reinforcing ply at a predetermined angle* having opposed deckle edges about the [carrier] *base plies and* immediately beneath the [surface] *outer* ply and overlapping the [deckle] edges *of the reinforcing ply* an amount *at most* no greater than the width of [one] *the* deckle edge *to uniformly form either a slight surface depression or a perfect overlap and to avoid a surface projection on the reinforcing along the entire length of the tube ply by previously trimming the reinforcing ply to a specific width narrower than the width which would produce a theoretically perfect overlap for the predetermined inside tube diameter and the predetermined winding angle for the reinforcing ply.*

* * * * *

UNITED STATES PATENT AND TRADEMARK OFFICE

CERTIFICATE OF CORRECTION

PATENT NO. : Re. 33,060

DATED : September 19, 1989

INVENTOR(S) : McCleery B. Cunningham and Clement D. LeHardy

It is certified that error appears in the above-identified patent and that said Letters Patent is hereby corrected as shown below:

Column 4, line 29, delete the first two comas.

Column 5, lines 11 and 12, delete "spiral-lywinding" and insert -- spirally winding --.

Column 6, line 6, after the word "reinforcing" insert the word -- ply --.

Column 6, line 7, after the word "tube" delete the word "ply".

Signed and Sealed this

Twenty-first Day of August, 1990

*Attest:*

HARRY F. MANBECK, JR.

*Attesting Officer*

*Commissioner of Patents and Trademarks*